(12) United States Patent
Nikunen et al.

(10) Patent No.: US 10,461,973 B2
(45) Date of Patent: Oct. 29, 2019

(54) PASSIVE RFID SENSOR TAG

(71) Applicant: METSO OYJ, Helsinki (FI)

(72) Inventors: Joona Nikunen, Pirkkala (FI); Ville Viikari, Espoo (FI)

(73) Assignee: METSO OYJ, Helsinki (FI)

( * ) Notice: Subject to any disclaimer, the term of this patent is extended or adjusted under 35 U.S.C. 154(b) by 0 days.

(21) Appl. No.: 15/578,988

(22) PCT Filed: Jun. 2, 2016

(86) PCT No.: PCT/FI2016/050397
§ 371 (c)(1),
(2) Date: Dec. 1, 2017

(87) PCT Pub. No.: WO2016/193549
PCT Pub. Date: Dec. 8, 2016

(65) Prior Publication Data
US 2018/0131542 A1 May 10, 2018

(30) Foreign Application Priority Data
Jun. 3, 2015 (FI) .................................... 20155420

(51) Int. Cl.
*H04L 27/12* (2006.01)
*G06K 19/07* (2006.01)
(Continued)

(52) U.S. Cl.
CPC .......... *H04L 27/12* (2013.01); *G06K 19/0724* (2013.01); *G06K 19/0726* (2013.01);
(Continued)

(58) Field of Classification Search
None
See application file for complete search history.

(56) References Cited

U.S. PATENT DOCUMENTS

| 4,210,870 A | 7/1980 | Kallio-Konno |
| 6,720,866 B1 | 4/2004 | Sorrells et al. |
| (Continued) | | |

FOREIGN PATENT DOCUMENTS

| JP | 2006-180507 A | 7/2006 |
| WO | 2015/101695 A1 | 7/2015 |

OTHER PUBLICATIONS

Nov. 20, 2015 Search Report issued in Finnish Patent Application No. 20155420.
(Continued)

*Primary Examiner* — K. Wong
(74) *Attorney, Agent, or Firm* — Oliff PLC

(57) ABSTRACT

In a RFID sensor tag, a sensing element is connected to an oscillator such that an oscillation frequency of the oscillator is dependent on a value of a predetermined variable sensed by the sensing element. The oscillation frequency of the oscillator is a harmonic multiple N of a modulation frequency required for a backscattering modulator. A frequency divider is arranged at the output of the oscillator to produce the modulation frequency from the oscillation frequency. The oscillator can be designed and dimensioned such that a high sensitivity is obtained with all sensor values, and the desired modulation frequency is derived resulting oscillation frequency by selecting a suitable division ratio N.

13 Claims, 4 Drawing Sheets

(51) Int. Cl.
*H04Q 9/00* (2006.01)
*G06K 19/077* (2006.01)

(52) U.S. Cl.
CPC .......... *H04Q 9/00* (2013.01); *G06K 19/0717* (2013.01); *G06K 19/0775* (2013.01); *G06K 19/07775* (2013.01); *H04Q 2209/47* (2013.01)

(56) References Cited

U.S. PATENT DOCUMENTS

| | | | | |
|---|---|---|---|---|
| 7,119,736 | B2* | 10/2006 | Heide | G01S 13/84 342/125 |
| 9,024,727 | B1 | 5/2015 | Otis et al. | |
| 9,094,054 | B2* | 7/2015 | Walley | G06K 7/10207 |
| 9,306,614 | B2* | 4/2016 | Ragonese | H03B 5/1228 |
| 2007/0030125 | A1 | 2/2007 | Friedrich | |
| 2007/0222583 | A1 | 9/2007 | Qi | |
| 2008/0136646 | A1 | 6/2008 | Friedrich | |
| 2010/0308980 | A1 | 12/2010 | Gosset et al. | |
| 2013/0099897 | A1 | 4/2013 | Forster | |

OTHER PUBLICATIONS

Nov. 20, 2015 Office Action issued in Finnish Patent Application No. 20155420.
Aug. 19, 2016 International Search Report issued in International Patent Application No. PCT/FI2016/050397.
Aug. 19, 2016 Written Opinion issued in International Patent Application No. PCT/FI2016/050397.
Chen et al.; "Coupling Passive Sensors to UHF RFID Tags;" Radio and Wireless Symposium (RWS); 2012 IEEE; Jan. 15-18; pp. 255-258.
Guerin et al.; "A temperature and gas sensor integrated on a 915MHz RFID UHF tag;" Wireless Information Technology adn Systems (ICWITS); 2010 IEEE International Conference; Aug. 28, 2010-Sep. 3, 2010.
Pesonen et al.; "Smart RFID Tags"; Development and Implementation of RFID Technology; Feb. 2009; pp. 159-178.
Jan. 15, 2019 Office Action issued in Japanese Patent Application No. 2017-562716.

* cited by examiner

PASSIVE RFID SENSOR TAG

FIELD OF THE INVENTION

The present invention relates to passive wireless sensors, particularly passive radio frequency identification (RFID) sensors, RFID sensor systems, and RFID readers for passive RFID sensor tags.

BACKGROUND OF THE INVENTION

Sensor is a device that transforms a measured quantity into a readable format, typically into an electrical signal. Nowadays, there are commercially available sensors virtually for any measurement purpose. According to the connectivity, sensors can be divided into wireless and wired sensors. Wired sensors are connected via wiring harnesses or cable assemblies to a reader device. Wireless sensors can be read without a physical connection to the sensor, and are often realized equipping the sensor with a radio transceiver. The transmitted radio signal is interpreted by a receiver which converts the wireless signal into a desired output. Wireless operation can be bene cial in many applications, where wired connection is di cult for example due to harsh operating conditions (like temperature and pressure), rotating parts, or cost and complexity of wiring. However, wireless sensors also have some drawbacks such as limited lifetime due to battery, limited read-out distance due to attenuation and interference, security issues because of the uncontrollable propagation of the signal and potentially low speed of communication. Based on the power source and communication principle, wireless sensors can be divided into three categories: active sensors, semi-passive sensors and passive sensors.

Active wireless sensors usually have both a radio transceiver and an on-board battery that is used to power up the transceiver. Active wireless sensors, having their own power sources, can use powerful transmitters and sensitive receivers. However, the battery on board limits the life time and also increases the size and weight. Due to more complex circuit, the price of an active sensor can be much higher than that of a passive sensor.

Semi-passive wireless sensors do not contain a radio transceiver, but are equipped with a battery. The battery is used to power up an integrated circuitry (IC) and enables the sensors to operate independently of the reader device or to maintain memory in the sensor. Semi-passive battery-assisted sensors utilize modulated backscattering technique for communication. This means that semi-passive sensors do not require any power from the on-board battery for transmission, but the sensor simply reflects back some of the power emitted by the reader device.

Unlike the active and semi-passive sensors, passive sensors do not require an on-board battery. Therefore they can be less complex, smaller, more inexpensive, and their lifetime is not limited by the power supply. The typical read-out distance of passive wireless sensors is between 10 cm and 3 m. Passive wireless sensors can be divided into four main categories: radio frequency identification (RFID) tags, electrical resonance circuit sensors, surface acoustic wave (SAW), harmonic sensors and intermodulation sensors.

RFID is an identification technology that uses radio waves to communicate between tags and a reader and it is used to identify items. There are a few advantages of RFID over optical barcode identification such as no line-of-sight is required between the reader device and the tag, and the RFID reader can also read hundreds of tags at a time. Passive RFID tags utilize the modulated backscattering communication principle which is illustrated in FIG. 1. When a tag 10 communicates with an RFID reader 11, it modulates the received signal 12 and reflects a portion of it 13 back to the reader. A typical passive tag consists of an antenna connected to an application specific microchip. When wirelessly interrogated by an RFID transceiver, or reader, the RFID tag antenna receives power and RF signals from the RFID reader and provides them to the chip. The chip processes the signals and sends the requested data back to the RFID reader. The backscattered signal is modulated according to the transmitted data. The highest operation frequency and read-out distance of RFID are limited by the rectified power for the integrated circuit (IC) and are a few GHz and 5-10 m, respectively.

RFID is mostly used for identification. RFID tags are equipped with a rewritable memory, which enables the reusability features of RFID tags, but they are not useful for measuring external quantities. RFID has also been shown to be suitable for sensing by equipping an RFID tag with an external sensor and digital logic to read the external sensor. The advantage of this approach is that it would use a generic sensor element and thus would be well suited for a very broad range of applications. In this approach, however, an additional A/D converter and digital circuitry has to be included to the tag in order to enable sensor read-out. Increased power consumption due to the additional electronics reduces the read-out range significantly (e.g. from 5 m to 0.3 m with an 8-bit A/D converter). An additional sensor element further increases power consumption. Implementation considerations of the A/D converter and additional digital circuits are discussed in [1]: Chapter 9 "Smart RFID Tags", in the book "Development and Implementation of RFID Technology", ISBN 978-3-902613-54-7, February 2009, I-Tech, Vienna, Austria. http://www.intechopen.com/books/development_and_implementation_of_rfid_technology.

US2013/0099897 discloses an RFID reader, an RFID chip, and an antenna electrically coupled to the RFID chip and configured to receive signals from and transmit signals to the RFID reader. The RFID chip is provided with an electrical interface to a sensing material. The RFID chip is configured to modulate a signal received from a reader and to drive the sensing material with the modulated signal. The sensing material has a variable electrical property, such that the backscattered modulated signal will change according to the condition of the sensing material. Regardless of the nature of the sensing material, it interacts with the modulated signal from the RFID chip and returns the signal to the RFID chip. The returned signal is passed from the RFID chip to the antenna via the backscatter modulator and then transmitted back to the RFID reader. Alternatively, the signal processed by the sensing material is used to modulate the input impedance of the RFID chip, with a signal from the RFID chip being backscattered to the RFID reader by the antenna to determine the condition of the sensing material.

Chen et al, Coupling Passive Sensors to UHF RFID Tags, Radio and Wireless Symposium (RWS), 2012 IEEE, 15-18 Jan. 2012, Santa Clara, 255-258, explores the possibility of coupling passive sensor data to existing UHF RFID tags without designing a new tag ASIC. The existing UHF RFID system can be used to convey additional data by overlaying a coupling loop on the tag antenna and modulating vector backscatter. The impedance of the passive sensor carrying the sensor data influences the value of amplitude and phase of the backscattering. For the transmission of the passive sensor data, the load of the passive sensor coupling module is switched between these three loads to provide the connection to one of the two reference impedances or the passive sensor. With two reference impedances, the impedance of the passive sensor is determined.

Guerin et al., A temperature and gas sensor integrated on a 915 MHz RFID UHF tag, Wireless Information Technology and Systems (IC-WITS), 2010 IEEE International Conference, Honolulu, Aug. 28 2010-Sep. 3 2010 discloses a passive wireless sensor utilizing the modulated backscattering principle. The modulation signal is generated by a voltage-controlled oscillator whose control voltage and thereby the output frequency is arranged to change in function of the sensor value.

Co-pending PCT/FI2013/051214 discloses passive wireless sensor design that enables a radically increased reading distance of passive wireless sensors. The modulation signal is generated by an oscillator that includes a sensing element as a part of an oscillating circuit, such that the modulation frequency is dependent on a sensed value of the sensing element. The RFID sensor operates in a similar way as a normal UHF RFID tag, except that the modulation frequency of the tag carries sensor information. According to the ISO/IEC 18000-6C standard, the modulation frequency of the tag is set by the reader device at the beginning of the communication, and it can be from 40 kHz to 640 kHz. The modulation frequency of the tag can vary ±4 . . . 22% from the initially set frequency depending on the frequency and operating conditions. This enables coding sensor information to the modulation frequency. This type of RFID sensor can be realized by modifying the internal oscillator of an RFID chip in such a way that its oscillation frequency tunes with the measured quantity. This can be done by loading the oscillator with an inductive, capacitive or resistive sensor element. An advantage of this principle is that generic sensor elements, such as MEMS sensors, can be used because the sensor is read out at low kHz frequencies. The sensor value is translated into a frequency of modulated analog signal which can be generated without an energy consuming AD conversion and with minimum number of extra component. The sensing element does not necessarily increase the power consumption of the tag, and the principle therefore offers a long read-out distance. The sensor circuitry is also fully isolated from the antenna, making the concept insensitive to antenna proximity effects. This concept can potentially be made compatible with the existing RFID systems, and many sensing elements can be incorporated into one RFID tag with digitally controlled switches. The sensing elements may be arranged so that the oscillation frequency is affected by only one element at a time.

In this type of RFID sensor, it is important that the RFID sensor can be made sensitive enough such that even a small change in the sensed property changes the modulation frequency so much that the change can be detected. The electrical properties of the sensor element are often given, and the oscillation frequency is typically constrained by frequency regulations, standards, or reader hardware. Therefore, the values of the oscillator components must be selected or adjusted such that the oscillation is obtained at the correct frequency and the sensitivity is at the desired level. This may require large components which may increase the size, the losses and the power consumption of the oscillator, and may not be practical task for all type of sensor elements. The designing must be done separately for each type of sensor element.

BRIEF DESCRIPTION OF THE INVENTION

An aspect of the present invention is an oscillator of a RFID sensor which enhances the sensor sensitivity.

An aspect of the invention is a passive radio frequency identification (RFID) transponder according to the attached independent claims. The preferred embodiments of the invention are disclosed in the dependent claims.

An aspect of the invention is a passive wireless transponder, comprising an antenna, a rectifier, and a modulator for communication with a backscattering principle to provide radio frequency identification (RFID) features, an oscillator providing a modulation frequency for the modulator, a sensing element connected to the oscillator such that an oscillation frequency of the oscillator is dependent on a value of a predetermined variable sensed by the sensing element, wherein the oscillation frequency is a harmonic multiple N of the modulation frequency.

In an embodiment, a frequency divider is arranged to produce the modulation frequency from the oscillation frequency.

In an embodiment, the sensing element comprises a capacitive sensing element, a resistive sensing element or an inductive sensing element.

In an embodiment, the frequency divider comprises an analog frequency divider or a digital frequency divider.

In an embodiment, a division ratio N of the frequency divider is controllable or programmable.

In an embodiment, a control unit of the transponder is arranged control or program the frequency divider.

In an embodiment, the sensing element can be read or interrogated at two or more modulation frequencies, and a division ratio N of the frequency divider is arranged to be changed depending on the modulation frequency selected by a reader or interrogator for reading or interrogating the specific sensing element.

In an embodiment, the transponder comprises a plurality of sensing elements arranged so that the oscillation frequency is affected by only one sensing element at a time.

In an embodiment, the transponder comprises a selector or digitally controlled switches are provided to connect one of the plurality of sensing elements at time to the oscillator.

In an embodiment, the oscillator comprises one of an RC oscillator, a ring oscillator, an LC-oscillator, an RLC-oscillator and a MEMS oscillator.

In an embodiment, the oscillator is designed and dimensioned operate at the harmonic oscillation frequency such that a high sensitivity is obtained, and the desired modulation frequency is derived from the harmonic oscillation frequency by a division ratio N, wherein N is an integer.

In an embodiment, the modulation frequency is within range of approximately 40-640 kHz, preferably from a group of 640 kHz, 320 kHz, 256 kHz, 160 kHz and 40 kHz.

In an embodiment, N is an integer equal to or greater than 10.

In an embodiment, the oscillation frequency is at least 5 MHz, preferably at least 10 MHz.

BRIEF DESCRIPTION OF THE DRAWINGS

In the following the invention will be described in greater detail by means of preferred embodiments with reference to the drawings, in which.

DETAILED DESCRIPTION OF THE INVENTION

Figure 1A:
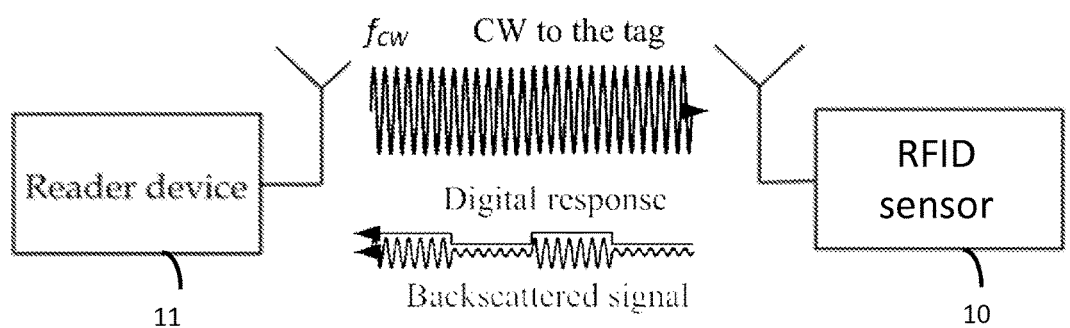
FIG. 1A illustrates backscattering communication principle in an RFID system.

Referring to FIG. 1A, an RFID system typically comprises two basic components: an RFID transponder or tag 10, which is located on the object to be identified or at a measurement point; an RFID interrogator or reader 11, which performs the interrogation of RFID tags. In a passive RFID system the RFID reader 11 supplies the tag 10 with essential power in order for it to perform modulation of the reader's interrogation signal. In the case of RFID sensor tags, in addition to just providing a power source and medium for the RFID tags 10 to operate and transmit data, an RFID reader 11 may perform data transmission, which is implemented, in most cases, as a modulation of the carrier signal, towards the tags 10.

Figure 2:
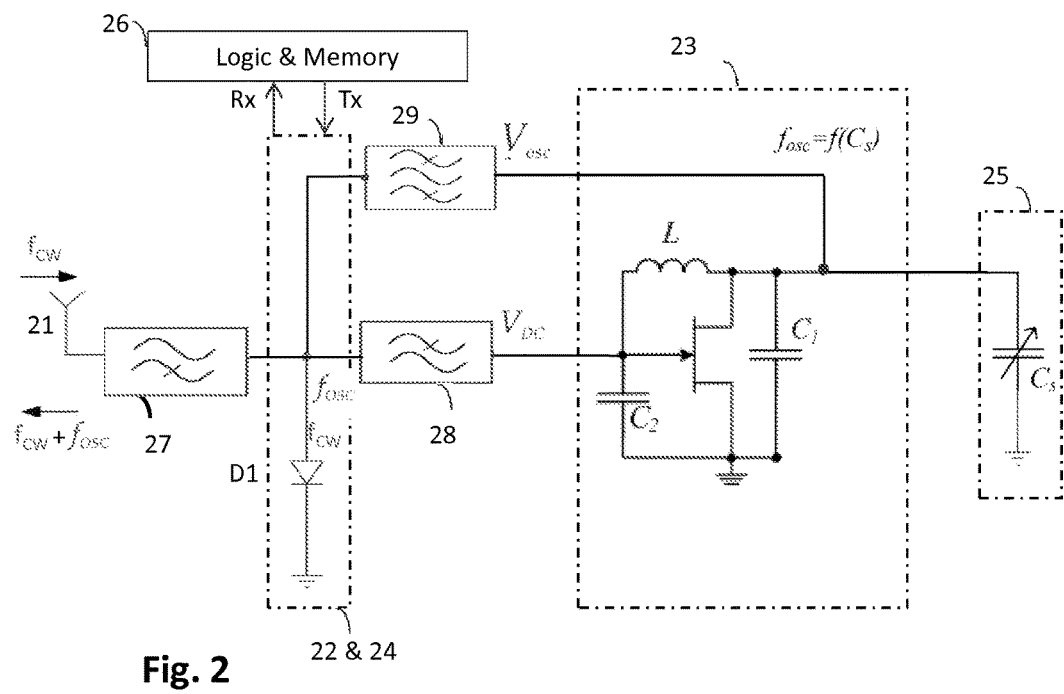
FIG. 2 is a simplified circuit diagram illustrating an example of a an RFID tag.

FIG. 2 shows a functional block diagram illustrating an example of radio frequency identity (RFID) tag architecture. For illustrative purposes, exemplary embodiments of the invention are described with only main parts: an antenna 21, a rectifier 22, an oscillator 23, a modulator 24 and a sensing element 25. In the illustrated example, the rectifier 22 and modulator 24 are the same element, such as a diode D1. The antenna 21 is matched to the rectifier 22 with a suitable matching circuit as well known to a person skilled in the art. Moreover, there may be a high pass filter 27 between the antenna 21 and the rectifier 22, a low pass filter 28 between the DC output of the rectifier 21 and the input of the low-frequency oscillator 23, and a band pass filter 29 between the output of the oscillator 23 and the input of the modulator 24. There may also be a logic part or a digital control module 26 that may be configured to provide desired functions, such as to handle interrogating commands, execute the anti-collision protocol, perform the data integrity check, run memory read-write operations, and perform output control and data flow. The logic implementation usually follows a defined standard and a certain associated protocol. Further, memory storage may be provided. Depending on a user's requirement, non-volatile memory storage may be needed if both read/write capability is implemented.

Figure 1B:
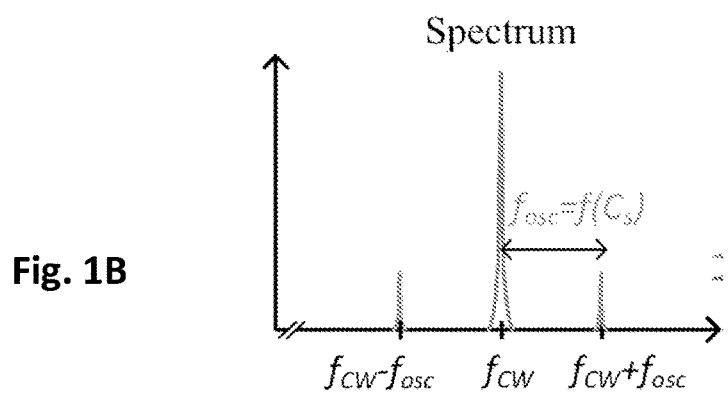
FIG. 1B illustrates sidebands or subcarriers $f_{CW}-f_{OSC}$ and $f_{CW}+f_{OSC}$ in the signal backscattered from the sensor.

As discussed above, the passive RFID tags utilize the modulated backscattering principle for communication. When a tag is illuminated with a radio frequency (RF) carrier wave (CW) signal transmitted from the reader 11, the tag modulates the received signal and reflects a portion of it back to the reader. The RFID sensor 10 is actuated using a radio frequency (RF) carrier wave (CW) signal transmitted from the reader 11. First, the RF signal is converted to DC voltage $V_{DC}$ by a rectifier 22. The rectified voltage $V_{DC}$ powers up an oscillator 23, which produces a low frequency sinusoid signal $f_{OSC}$ at its output. Finally, the oscillation signal $f_{OSC}$ is fed to the backscatter modulator 24 to realize the backscattering principle. The modulator 24 modulates the signals, and those going back to the antenna 21 depend on the matching between the antenna and the rectifier 22/modulator 24. As a consequence, there are sidebands or subcarriers $f_{CW}-f_{OSC}$ and $f_{CW}+f_{OSC}$ in the signal backscattered from the sensor, as illustrated in the FIG. 1B. $f_{CW}$ and $f_{OSC}$ represent the carrier frequency and oscillation frequency, respectively. The sidebands or subcarriers are o set from the carrier $f_{CW}$ by the oscillation frequency $f_{OSC}$. The oscillation frequency $f_{OSC}$ may also be referred to as a backscattering modulation frequency or a subcarrier frequency.

The frequency of the oscillator 23 is dependent on a sensed value. This enables the sophisticated features of RFID and the possibility to measure external quantities without AD conversion. In exemplary embodiments, a sensing element (e.g. as illustrated by a sensing element 25 in FIG. 2) is configured to be an elementary part of an oscillating circuit of a tag oscillator such that the modulation frequency output from the oscillator is dependent on a sensed value, i.e. a value range of sensed quantity is mapped to an oscillation frequency range. This enables the possibility to measure external quantities without practically any power consuming extra components and the possibility to measure external quantities without reducing the read-out distance. The concept is compatible for existing RFID tags. Examples of applicable oscillators may include an RC oscillator, a ring oscillator, an LC-oscillator, an RLC-oscillator, or any other resonant-based oscillator, such as an oscillator based on MEMS (microelectro-mechanical systems), SAW (surface acoustic wave), and BAW (bulk acoustic wave) resonators. The advantage of an RC-oscillator is that it can be integrated while it may have higher power consumption and thus the read-out distance may be reduced in comparison with LC-oscillator or an RLC-oscillator, for example. In FIG. 2, the exemplary oscillator 23 is implemented as a Collpitts oscillator.

In this type of RFID sensor, it is important that the sensor can be made sensitive enough such that even a small change in the sensor value changes the modulation frequency so much that the change can be detected.

Figure 3:
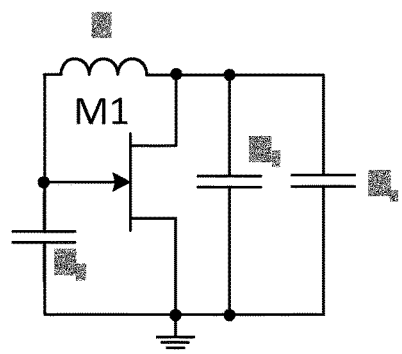
FIG. 3 illustrates a simplified electrical equivalent circuit of a Collpitts oscillator loaded with a capacitive sensor element.

Let us use the simplified electrical equivalent circuit of the Collpitts oscillator shown in FIG. 3 to study the frequency sensitivity of the oscillator to a capacitive sensing element 25. The oscillator 23 is loaded with a capacitive sensing element Cs in parallel to the capacitor C1. For simplicity, losses are neglected in this analysis.

The oscillation frequency f0 of the oscillator shown in FIG. 3 is given as $$f_0 = \frac{1}{2\pi}\sqrt{\frac{C_1+C_S+C_2}{L(C_1+C_S)C_2}}.$$

The relative tangential frequency sensitivity of the circuit to a relative change in the sensor capacitance is given as $$\frac{\Delta f/f_0}{\Delta C_S/C_S} = -\frac{1}{2}\frac{C_S C_2}{(C_1+C_S)(C_1+C_S+C_2)}.$$

The highest sensitivity is −0.5, and it is obtained when the capacitance value of the capacitor C1=0 and the capacitance value of the capacitor C2→∞. This means that if the sensing element 25 changes its value 1%, the frequency change is −0.5% or less in absolute value.

However, the oscillation frequency $f_0$ is typically constrained by frequency regulations, standards, or reader hardware. In addition, the sensor capacitance Cs is often given. Under these circumstances, values of the inductor L, the capacitor C1, and the capacitor C2 can be adjusted for the desired sensitivity. Inductors often are relatively high-loss components as compared to capacitors, and therefore the inductor L should be selected properly not to increase the losses and the power consumption of the oscillator 23.

Inductors are often modelled with an electrical equivalent circuit consisting of a resistor and an inductor in series such that these two series components are in parallel with a capacitor. For such an electrical equivalent circuit, it can be shown that the quality factor peaks at the self-resonance frequency (SRF) divided by √3. Therefore, when the oscillation frequency $f_0$ is set, an inductor whose SRF is approximately √3 $f_0$ should be selected. Finally, the capacitances C1 and C2 should be selected such that the oscillation is obtained at the correct frequency and the sensitivity is as high as possible.

To simplify the following equations, let us define the needed total capacitance as $$C_{tot} = \frac{1}{(2\pi f_0)^2 L}.$$

When Cs<Ctot, the highest sensitivity is $$\frac{\Delta f / f_0}{\Delta C_s / C_s} = -\frac{1}{2}\frac{C_s}{C_{tot}}$$

and it is obtained when C1=Ctot−Cs and C2→∞. Similarly, when Cs>Ctot, the highest sensitivity is $$\frac{\Delta f / f_0}{\Delta C_s / C_s} = -\frac{1}{2}\frac{C_{tot}}{C_s}$$

which is obtained when C1=0 and $$C_2 = \frac{C_{tot} C_s}{C_{tot} + C_s}.$$

Figure 4:
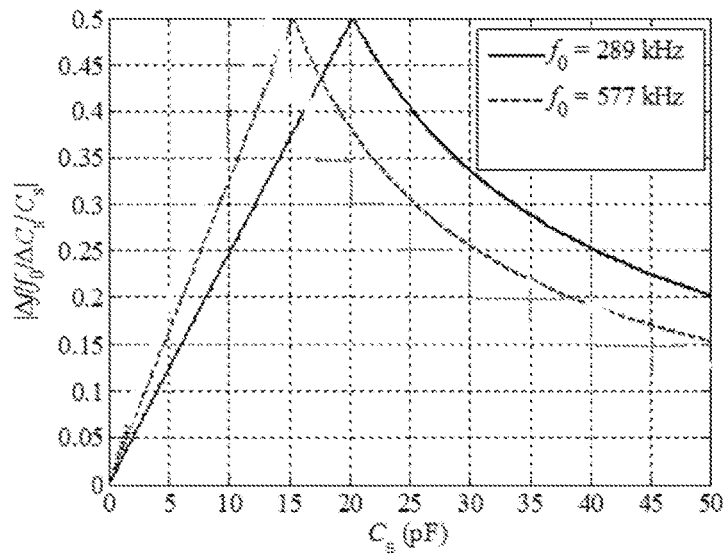
FIG. 4 is a graph illustrating the achievable sensitivity as a function of the sensor capacitance Cs for a low frequency oscillator.

The derived equations can be used to relate the oscillation frequency $f_0$ to the obtainable sensitivity with certain sensing element 25. For instance, FIG. 4 shows the achievable sensitivity as a function of the sensor capacitance Cs for two different inductors (RL875S-103K-RC, and RL875S-332K-RC, fabricated by Bourns) with L=10 mH and L=3.3 mH, respectively. Both inductors provide different oscillation frequency $f_0$, namely 289 kHz and 577 kHz. The highest sensitivity with the inductor L=10 mH is obtained when the sensor capacitance Cs is 20 pF and, respectively, the highest sensitivity with the inductor L=3.3 mH is obtained when the sensor capacitance Cs is 15 pF.

The ISO 18000-6C standard defines that an RFID tag shall support 40-640 kHz modulation frequency range. This analysis shows that if the modulation frequency should be in the order of 200-500 kHz, the optimal sensor capacitance value is 15-20 pF or larger. However, many practical sensing elements, such as many MEMS sensors, provide a capacitance of only a few pF. In such a case, sensitivity can be only about one tenth of the highest possible sensitivity. As a consequence, only a modest read-out resolution can be achieved with this read-out technique for MEMS and other sensors exhibiting a low capacitance.

Figure 5:
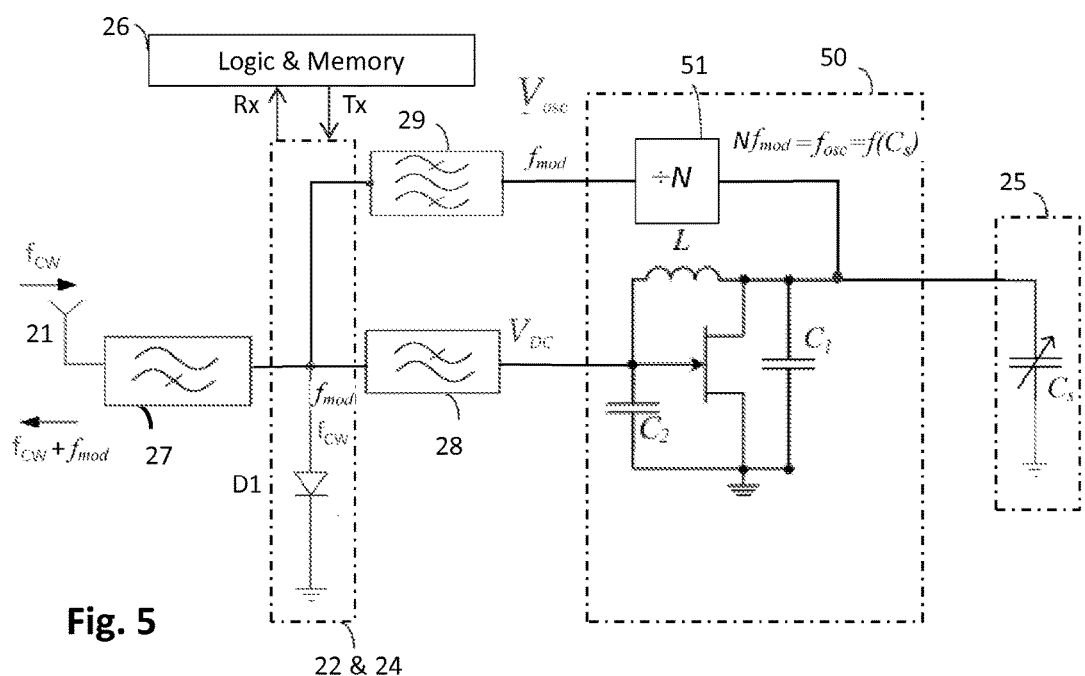
FIG. 5 is a simplified circuit diagram illustrating an example of an RFID sensor tag having a harmonic oscillator and a frequency divider according to an exemplary embodiment.
Figure 6:
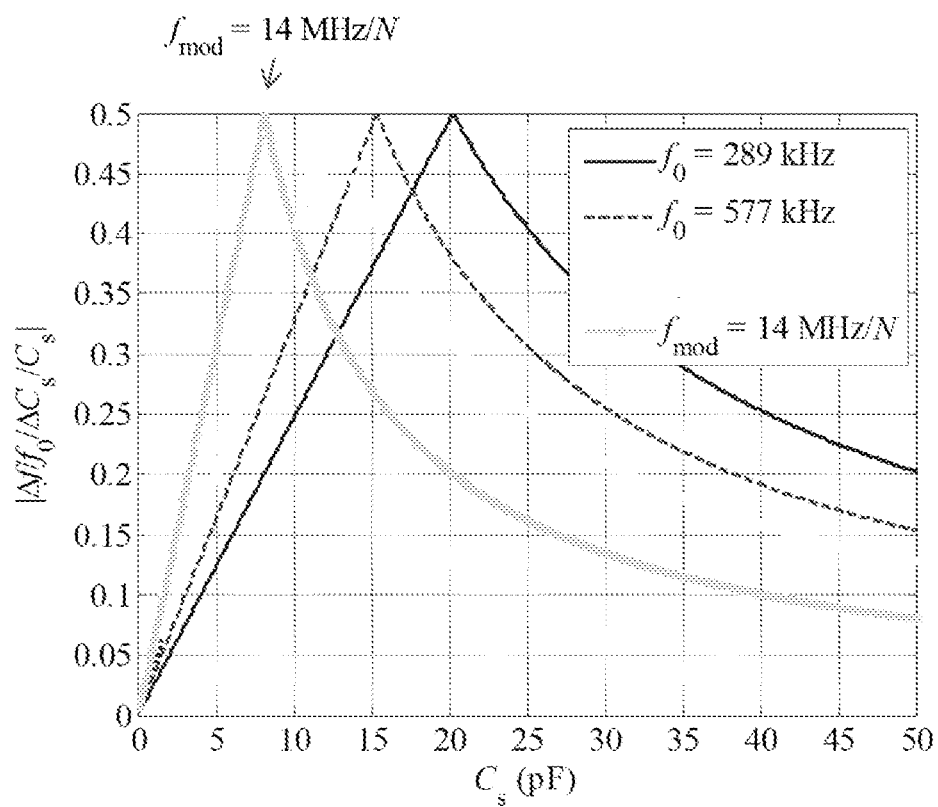
FIG. 6 is a graph illustrating achievable sensitivity as a function of the sensor capacitance Cs with a harmonic oscillator according to an exemplary embodiment in comparison with a low frequency oscillator.

An aspect of the invention is an oscillator of a RFID sensor which enhances the sensor sensitivity. An example of a transponder or a RFID sensor tag having an oscillator embodying this aspect of the invention is illustrated in FIG. 5. Same reference symbols in FIG. 2 and FIG. 5 may refer to same or similar functions and structures. In an embodiment, the oscillation frequency $f_{OSC}$ of the oscillator 50 that provides a modulation frequency $f_{MOD}$ for a backscattering modulator 24 is a harmonic multiple N of the desired modulation frequency $f_{MOD}$. The sensing element 25 is connected to the oscillator 50 such that an oscillation frequency $f_{OSC}$ of the oscillator 50 is dependent on a value of a predetermined variable sensed by the sensing element 25. In an embodiment, a frequency divider 51 is arranged at the output of the oscillator 50 to produce the modulation frequency $f_{MOD}$ from the oscillation frequency $f_{OSC}$ for the modulator 24. The division ratio N can be selected such that the highest sensitivity can be obtained with all sensor capacitance values Cs. As an example, FIG. 6 shows the achievable sensitivity with the inductor RL875S-100L-RC (L=10 μH) as a function of the sensor capacitance Cs. In this exemplary case, the oscillation frequency is 14 MHz and the modulation frequency $f_{MOD}$ is 14 MHz divided by an integer N. For instance, the modulation frequency is 290 kHz if N=48. The highest sensitivity with this inductor is obtained when the sensor capacitance is 8 pF. Thus, high sensitivity is achieved also with small sensor capacitance values. The use of the harmonic oscillator allows maximizing the sensitivity for different sensor capacitance values Cs regardless of the oscillation frequency $f_{OSC}$ used. The oscillator 50 can be designed and dimensioned such that a high sensitivity is obtained, and the desired modulation frequency $f_{MOD}$ is derived resulting oscillation frequency $f_{OSC}$ by selecting a suitable division ration N.

Although one type of harmonic oscillator 50 and a capacitive sensing element 25 are illustrated above, it should be appreciated that any type of oscillator may be used for a harmonic oscillator 50 or any type of sensing element, such as resistive sensing element or a inductive sensing element may be used for the sensing element 25 according to principles of the present invention.

The frequency divider 51 may be implemented by any type of analog or digital frequency divider suitable for RF operation. Various designs or commercial products suitable for the frequency divider 51 are well-known and obvious to a person skilled in the art In an embodiment the division ratio N of the frequency divider 51 is controllable. In an embodiment, the frequency divider 51 is a programmable. In an embodiment, the control logic 26 of the RFID tag may be configured to control or program the division ratio N of the frequency divider 51 for each specific sensing element 25.

In an embodiment, a sensing element can be read or interrogated at two or more of the nominal modulation frequencies. In an embodiment, the division ratio N of the frequency divider 51 is arranged to be changed depending on the modulation frequency selected by a reader or interrogator for reading or interrogating a specific sensing element. The oscillation frequency may not be changed. In an embodiment, the frequency divider 51 is programmable. In an embodiment, the control logic 26 of the RFID tag may be configured to control or program the division ratio N of the frequency divider 51 for a specific sensing element 25 according to the modulation frequency selected by a reader or interrogator for reading or interrogating the specific sensing element. A capability of operating the same sensing element at more than one backscattering modulation frequency, the sensing element can be read or interrogated without beforehand knowing which modulation frequency the specific sensing element is tuned or configured to. Moreover, the capability of transferring sensor data to a reader at more than one selectable backscattering modulation frequency, allows optimizing a reading distance or reading speed, if required.

In an embodiment, a plurality of sensing elements 25 (two or more) can be incorporated into one RFID tag 11. The plurality of sensing elements 25 can be arranged so that the oscillation frequency $f_{OSC}$ is affected by only one sensing element at a time. In an embodiment, a selector is provided to connect one sensing element 25 at time to the oscillator 50. In an embodiment, digitally controlled switches are provided to connect one sensing element 25 at time to the oscillator 50.

It will be obvious to a person skilled in the art that the inventive concept can be implemented in various obvious alternative ways. The invention and its embodiments are not limited to the examples described above but may vary within the scope of the claims.

The invention claimed is:

1. A passive radio frequency identification (RFID) transponder, comprising:
   an antenna configured to receive radio frequency (RF) interrogation signals from an RFID reader and send RF backscattering signals to the RFID reader,
   a rectifier connected to the antenna and configured to power up the passive RFID transponder from the received RF interrogation signals,
   a backscatter modulator configured to modulate the RF backscattering signals with a modulation frequency and connected to the antenna for communication to the RFID reader with a backscattering principle to provide radio frequency identification (RFID) features,
   an oscillator having an oscillation frequency, and
   a sensing element configured to measure a predetermined variable external to the RFID transponder, the sensing element having an electrical property that varies based on variation in value of the measured predetermined variable,
   wherein the sensing element is connected to the oscillator such that the variation in the electrical property of the sensing element changes the oscillation frequency of the oscillator, the oscillator frequency being dependent on the value of the predetermined variable measured by the sensing element, and
   wherein the oscillation frequency of the oscillator is a harmonic multiple N of the modulation frequency of the backscatter modulator, and wherein a frequency divider is arranged between the oscillator and the backscatter modulator to derive the modulation frequency from the oscillation frequency.

2. A transponder as claimed in claim 1, wherein the sensing element comprises a capacitive sensing element, a resistive sensing element or an inductive sensing element.

3. A transponder as claimed in claim 1, wherein the frequency divider comprises an analog frequency divider or a digital frequency divider.

4. A transponder as claimed in claim 1, wherein a division ratio N of the frequency divider is controllable or programmable.

5. A transponder as claimed in claim 1, wherein a control unit of the transponder is arranged control or program the frequency divider.

6. A transponder as claimed in claim 1 wherein the sensing element can be read or interrogated at two or more modulation frequencies, and wherein a division ratio N of the frequency divider is arranged to be changed depending on the modulation frequency selected by a reader or interrogator for reading or interrogating the specific sensing element.

7. A transponder as claimed in claim 1, comprising a plurality of sensing elements arranged so that the oscillation frequency is affected by only one sensing element at a time.

8. A transponder as claimed in claim 7, comprising a selector or digitally controlled switches are provided to connect one of the plurality of sensing elements at time to the oscillator.

9. A transponder as claimed in claim 1, wherein the oscillator comprises one of an RC oscillator, a ring oscillator, an LC-oscillator, an RLC-oscillator, and a MEMS oscillator.

10. A transponder as claimed in claim 1, wherein the oscillator is designed and dimensioned operate at the harmonic oscillation frequency such that a high sensitivity is obtained, and the desired modulation frequency is derived from the harmonic oscillation frequency by a division ratio N, wherein N is an integer.

11. A transponder as claimed in claim 1, wherein the modulation frequency is within range of approximately 40-640 kHz.

12. A transponder as claimed in claim 1, wherein N is an integer equal to or greater than 10.

13. A transponder as claimed in claim 1, wherein the oscillation frequency is at least 5 MHz.

* * * * *